(No Model.)

W. A. BRADEN.
PACKING FOR PISTONS, VALVES, &c.

No. 542,137. Patented July 2, 1895.

Witnesses:
J. Halpenny
Geo. F. Bailey

Inventor:
William A. Braden
By Gridley & Hopkins
His Attys.

UNITED STATES PATENT OFFICE.

WILLIAM A. BRADEN, OF CHICAGO, ILLINOIS, ASSIGNOR OF ONE-THIRD TO JAMES S. HOLMES, OF SAME PLACE.

PACKING FOR PISTONS, VALVES, &c.

SPECIFICATION forming part of Letters Patent No. 542,137, dated July 2, 1895.

Application filed August 9, 1894. Serial No. 519,787. (No model.)

*To all whom it may concern:*

Be it known that I, WILLIAM A. BRADEN, a subject of Victoria, Queen of the Kingdom of Great Britain and Ireland, residing at Chicago, in the county of Cook and State of Illinois, have invented certain new and useful Improvements in Packing for Pistons, Valves, &c., of which the following is a specification, reference being had to the accompanying drawings, which are made a part hereof, and in which—

Figure 1:
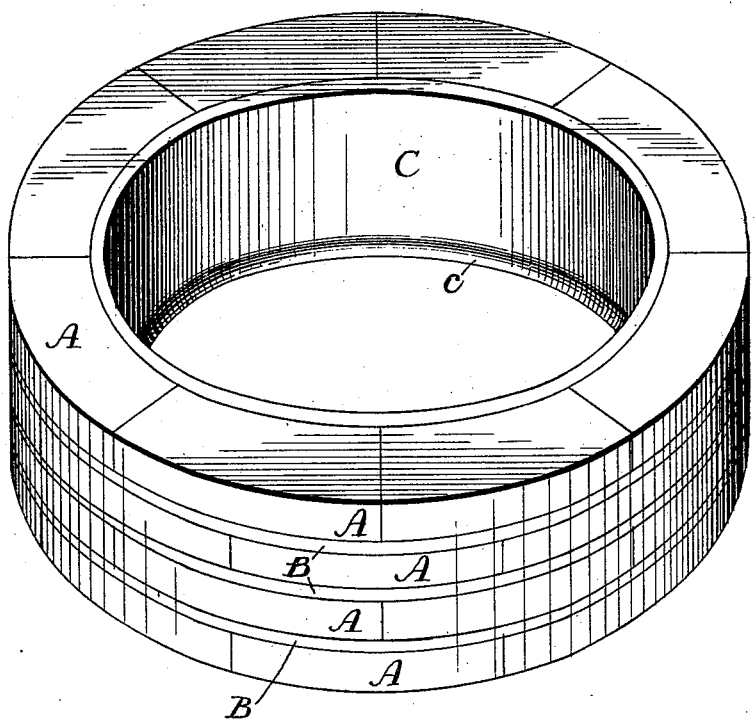
Figure 2:
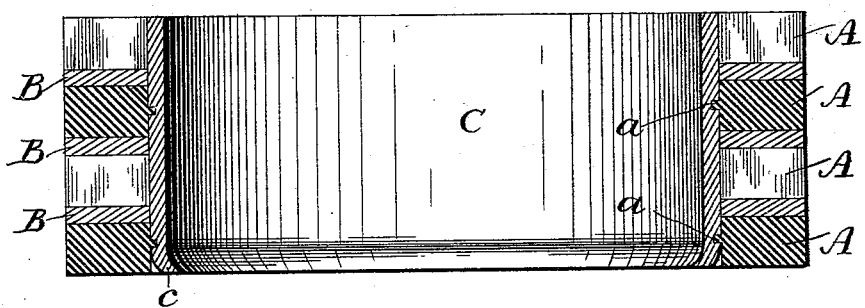
Figure 3:
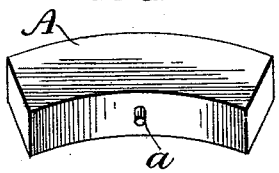

Figure 1 is a perspective view of a packing embodying the invention. Fig. 2 is an axial section thereof. Fig. 3 is a perspective view of one of a number of segments used in constructing the improved packing.

The invention relates to that class of packings which are made up of a number of metal rings alternating with a number of rings of leather or similar absorbent material, and the object of the said invention is to improve the construction of packings of this character.

To this end the invention consists in the features of novelty that are particularly pointed out in the claims hereinafter.

In the drawings, A represents the metallic rings, B the non-metallic rings, and C a short non-metallic cylinder around which said rings fit snugly. Preferably the rings B and cylinder C are made of leather, rawhide, or other material that is absorbent and that will consequently swell when soaked with water, oil, or the like, and the rings B are continuous. The rings A are segmental, and this is an essential feature of the invention; but so far as length is concerned they may vary considerably and range from twenty-two and one-half to sixty degrees, the former length being preferable. The segments are arranged so that the segments of one ring break joints with the segments of another ring, and each segment is provided with a short pin or stud *a*, that is forced into the cylinder C for the purpose of preventing relative movement. Before the parts are assembled glue is applied to them in such manner that when they are assembled and the glue hardens they will be held together with sufficient firmness to permit the outer periphery of the packing to be dressed off to a true cylinder and to permit of the packing to be handled as an article of manufacture and put in place upon the piston, valve, or other part upon which it is to be used. After it is in place the water or other liquid will dissolve the glue and free the parts to the extent of permitting the cylinder C, in expanding, to force the several segmental sections of the rings A outward. Preferably one end of the leathern cylinder C is turned inward to form a flange *c* for the purpose of avoiding leakage beneath the packing.

What I claim as new, and desire to secure by Letters Patent, is—

1. In a packing, the combination of a number of packing rings and a nonmetallic cylinder, open at both ends, around which said rings fit, said cylinder having at its end a short inturned lip, said lip being flexible and free substantially as set forth.

2. In a packing, the combination of a number of metallic and non-metallic rings arranged alternately, each of the metallic rings being made up of a number of segments, and a cylinder around which all of the rings fit, each segment having a pin entering the cylinder, substantially as shown and described.

3. In a packing, the combination of a number of metallic and non-metallic rings arranged alternately, each of the metallic rings being made of a number of segments, and a non-metallic cylinder around which all of the rings fit, the parts being temporarily secured together by a substance soluble in water, substantially as shown and described.

WILLIAM A. BRADEN.

Witnesses:
JAMES S. HOLMES,
L. M. HOPKINS.